(12) United States Patent
Chen et al.

(10) Patent No.: US 9,772,064 B2
(45) Date of Patent: Sep. 26, 2017

(54) DISPLAY WITH A SUPPORTING MECHANISM

(71) Applicants: QISDA (SUZHOU) CO., Ltd., Suzhou, Jiangsu Province (CN); QISDA CORPORATION, Taoyuan (TW)

(72) Inventors: Chih-Hung Chen, Taipei (TW); Ching-Lin Yeh, Taoyuan (TW); Kuo-Wei Ling, Taipei (TW)

(73) Assignees: Qisda (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 0 days.

(21) Appl. No.: 15/086,079

(22) Filed: Mar. 31, 2016

(65) Prior Publication Data
US 2016/0295716 A1    Oct. 6, 2016

(30) Foreign Application Priority Data
Apr. 2, 2015    (TW) .............................. 104110960 A

(51) Int. Cl.
| F16M 13/08 | (2006.01) |
| F16M 13/02 | (2006.01) |
| F16M 13/00 | (2006.01) |
| F16M 11/04 | (2006.01) |
| F16B 1/00  | (2006.01) |

(52) U.S. Cl.
CPC .......... *F16M 13/02* (2013.01); *F16M 11/041* (2013.01); *F16M 13/005* (2013.01); *F16B 2001/0035* (2013.01); *F16M 2200/021* (2013.01); *F16M 2200/024* (2013.01)

(58) Field of Classification Search
USPC .... 248/441.1, 444, 446, 447, 454, 455, 456, 248/457, 458, 460, 462, 463, 918, 919, 248/920, 921, 922, 917, 145.6; 361/679.21, 679.26, 679.27, 679.55, 361/679.56, 679.3; 16/110.1, 408, 409, 16/410, 430
See application file for complete search history.

(56) References Cited

U.S. PATENT DOCUMENTS 6,651,943 B2 * 11/2003 Cho ..................... F16M 11/105
                                                                 248/122.1
8,490,789 B2 *  7/2013 Lach ..................... A45C 11/00
                                                                 206/320

(Continued)

*Primary Examiner* — Alfred Wujciak

(57) ABSTRACT

A display with a supporting mechanism includes a display module and a supporting device connecting the display module. The supporting device includes a base and a rotatable support. The base is used for fixing the display module and includes a first constraint structure. The rotatable support includes a rotation member pivotally connected to the base, a connection member, and a handle pivotally connected to the rotation member through the connection member. The connection member includes a second constraint structure engaged with or disengaged from the first constraint structure. Therein, when the rotation member is located at a position relative to the base, the first and second constraint structures are engaged with each and thus prevent the handle from rotating relative to the rotation member through the connection member, so that a user can carry the display module by gripping the handle with a hand.

15 Claims, 10 Drawing Sheets

(56) References Cited

U.S. PATENT DOCUMENTS

| | | | |
|---|---|---|---|
| 2004/0183314 A1* | 9/2004 | Klompenburg | E05C 9/02 292/263 |
| 2006/0049327 A1* | 3/2006 | Chen | F16M 11/105 248/371 |
| 2016/0192752 A1* | 7/2016 | Lach | A45C 11/00 206/45.2 |

* cited by examiner

DISPLAY WITH A SUPPORTING MECHANISM

BACKGROUND OF THE INVENTION

1. Field of the Invention

The invention relates to a display, and especially relates to a display capable of being carried with a supporting device.

2. Description of the Prior Art

Currently, tablet devices are used widely. For satisfaction of different usage environments, accessories for convenience of users to use tablet devices are available on the market, such as supporting devices, protection covers and so on for the tablet devices. Conventional supporting devices for tablet devices are usually used independently or in coordination with a protection cover. For the above both cases, the supporting devices are usually designed to support the tablet devices on a plane such as a desktop. For the case that the supporting device is used independently, the supporting device needs to be stored when not in use, which causes the user inconvenience to a certain extent. When the tablet device needs to be transferred to another place, the user needs to hold the whole tablet device (including the protection cover assembled thereon). If the user wants to transfer the tablet device by carrying it with a hand, a handle for the user to grasp is usually provided by the tablet device itself or the protection cover thereon. For the supporting device, if the supporting device includes a rotatable supporting foot which is used for supporting the tablet device tilted, the tablet device will rotate when the user takes the supporting foot as a handle and grasps it, which causes inconvenience to the user. Thus the supporting foot is unsuitable for a handle for the user to hold for transfer the tablet device. Therefore, the current supporting devices cannot provide both supporting function and carrying function.

SUMMARY OF THE INVENTION

An objective of the invention is to provide a display with a supporting mechanism. The supporting mechanism uses a rotatable support to provide both supporting function and carrying function. When in a carrying state, the rotatable support can prevent the display from turning relative to the supporting device, so that a user can stably carry or hold the display through the supporting mechanism.

A display with a supporting mechanism according to the invention includes a portable electronic display module and a supporting device connecting the display module. The supporting device includes a base and a rotatable support. The base is used for fixing the display module and includes a first constraint structure. The rotatable support includes a rotation member, a handle, and a connection member. The rotation member is pivotally connected to the base. The handle is pivotally connected to the rotation member through the connection member, so that the handle can rotate toward and away from the base. The connection member includes a second constraint structure engaged with or disengaged from the first constraint structure. Therein, when the rotation member is located at a position relative to the base, the first constraint structure and the second constraint structure are engaged with each other and prevent the handle from rotating relative to the rotation member through the connection member, so that a user can stably carry or hold the display module through the handle. Furthermore, when the rotation member is located at another position relative to the base, the first constraint structure and the second constraint structure are disengaged from each other, so that the handle is rotatable relative to the rotation member through the connection member. At the moment, the user can rotate the handle for supporting the display module obliquely, for example on a desktop. Thereby, the supporting device can provide both supporting function and carrying function. The user can achieve the purposes of supporting the display module and carrying the display module by manipulating the supporting device. The display can be supported obliquely on a desktop or stably carried or held by a user by manipulating the rotatable support of the supporting device.

Compared with the prior art, the supporting device of the display according to the invention uses the same component (i.e. the rotatable support, especially the handle thereof) to obtain both supporting function and carrying function. Therefore, the supporting device can provide various uses through using the single supporting device, which facilitates the usage of the display module by the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
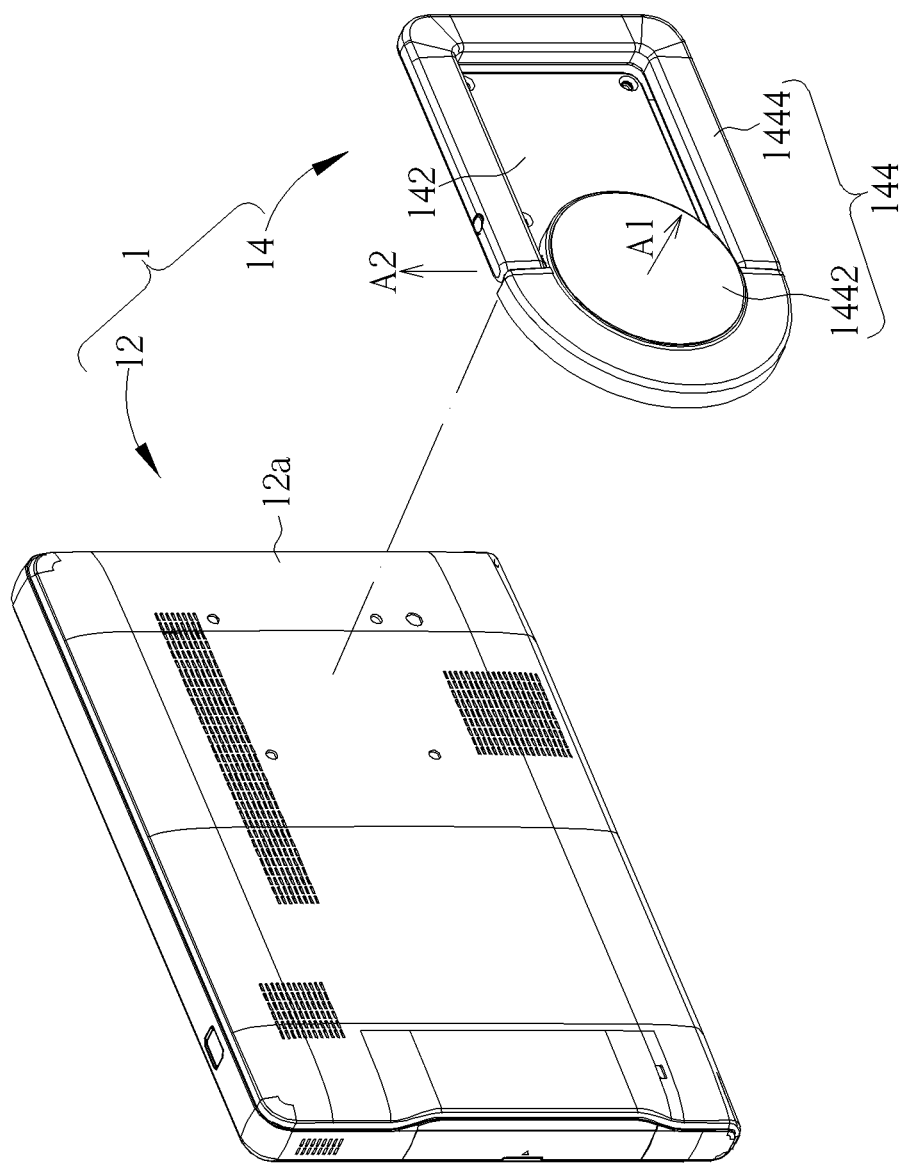
FIG. 1 is an assembly diagram of a display with a supporting mechanism of an embodiment according to the invention.
Figure 2:
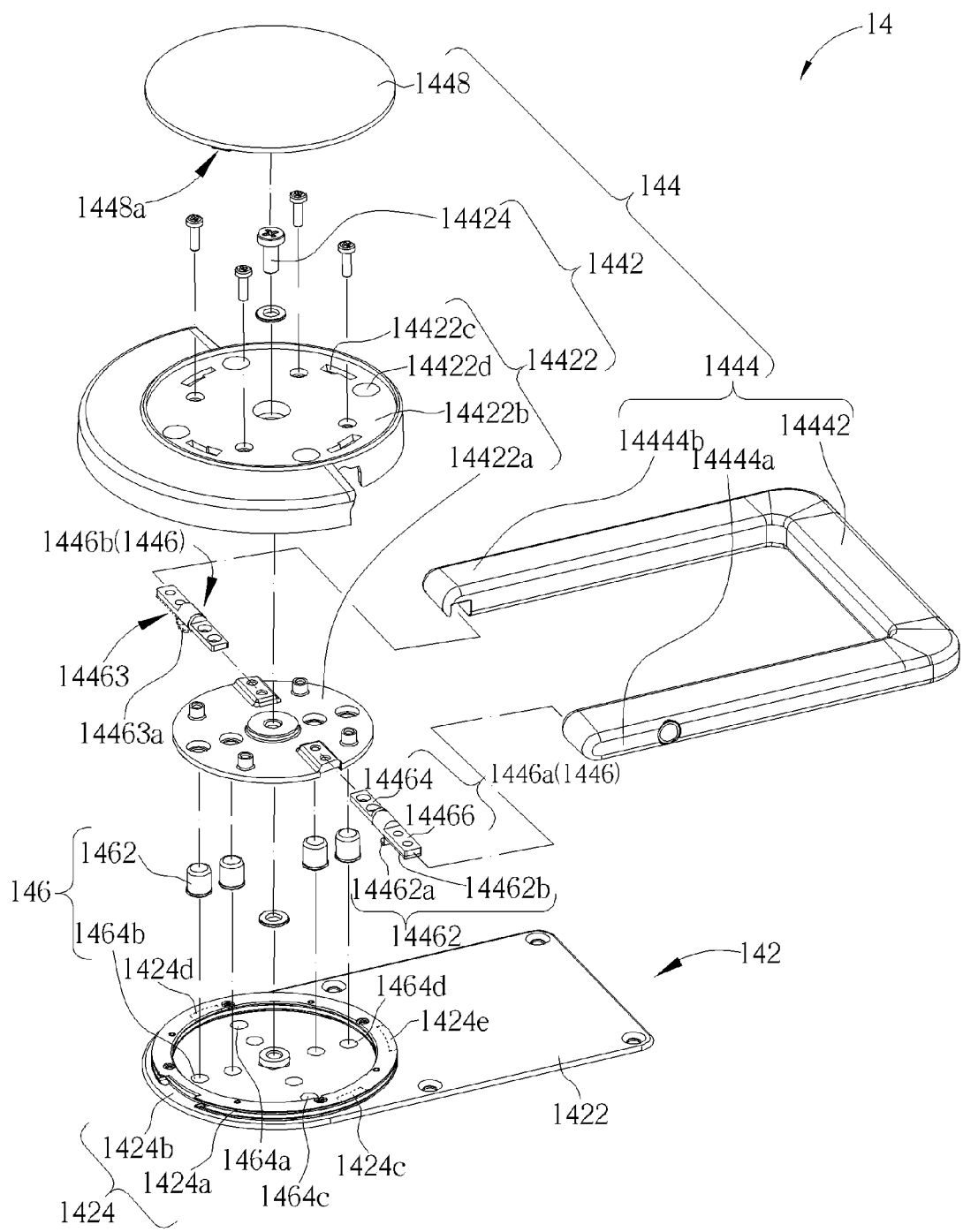
FIG. 2 is an exploded view of a supporting device of the display in FIG. 1.

Please refer to FIG. 1, which is an assembly diagram of a display 1 with a supporting mechanism of an embodiment according to the invention. The display 1 includes a display module 12 and a supporting device 14. The supporting device 14 functions as the supporting mechanism of the display 1 for supporting the display module 12. The supporting device 14 includes a base 142 and a rotatable support 144. The rotatable support 144 is pivotally connected to the base 142. The base 142 is connected to a back cover 12*a* of the display module 12. Thereby, a user can manipulate the rotatable support 144 so as to support the display module 12, for example but not limited to, on a desktop or carry or hold the display module 12. Please also refer to FIG. 2. FIG. 2 is an exploded view of the supporting device 14. The rotatable support 144 includes a rotation member 1442, a handle 1444, and a connection member 1446. The rotation member 1442 is pivotally connected to the base 142. The handle 1444 is pivotally connected to the rotation member 1442 through the connection member 1446, so that the handle 1444 can rotate toward and away from the base 142. Therein, the rotation member 1442 and the base 142 are pivotally connected by a first rotation axis A1. In the embodiment, the rotation member 1442 is substantially parallel to the back cover 12a of the display module 12 and is rotatable relative to the back cover 12a. The handle 1444 and the rotation member 1442 are pivotally connected through the connection member 1446 by a second rotation axis A2. The second rotation axis A2 and the first rotation axis A1 are not parallel, so that the handle 1444 can rotate toward and away from the base 142 (or the back cover 12a of the display module 12). In the embodiment, the first rotation axis A1 is perpendicular to the second rotation axis A2; however, the invention is not limited thereto.

The base 142 includes a base plate 1422 and a first constraint structure 1424. The base plate 1422 is fixed on the back cover 12a of the display module 12. The first constraint structure 1424 is disposed on the base plate 1422. The connection member 1446 includes a second constraint structure 14462. According to different positions to which the rotation member 1442 rotates relative to the base 142, the first constraint structure 1424 and the second constraint structure 14462 engage with or disengage from each other. Further, in the embodiment, the rotation member 1442 includes a rotatory part 14422 and a pivotal connection shaft 14424. The rotatory part 14422 is pivotally connected to the base plate 1422 of the base 142 through the pivotal connection shaft 14424. The rotatory part 14422 includes a rotation disk 14422a and a casing 14422b. The pivotal connection shaft 14424 passes through the rotation disk 14422a and the casing 14422b. The rotation disk 14422a is located between the base plate 1422 and the casing 14422b. The casing 14422b is fixedly connected to the rotation disk 14422a and covers the rotation disk 14422a. The first constraint structure 1424 is fixed on the base plate 1422 and has a sliding slot 1424a and a slot opening 1424b. In practice, the first constraint structure 1424 can be formed by three rings, which stack on the periphery of the rotation disk 14422a and are fixed on the base plate 1422. Therein, the outer diameter of the middle ring is smaller than the outer diameters of the other two rings, so that the sliding slot 1424a is formed therein. The sliding slot 1424a extends along a curve path (i.e. substantially an arc about the first rotation axis A1) relative to the rotation disk 14422a of the rotation member 1442. The upper and lower rings have notches at specific positions so as to form the above-mentioned slot opening 1424b. However, the invention is not limited thereto. For example, the first constraint structure 1424 can be made by machining a single rim part.

In the embodiment, the handle 1444 shows a U-shaped structure. The connection member 1446 includes two opposite hinges 1446a and 1446b correspondingly, so that the handle 1444 is pivotally connected to the rotation member 1442 through the two end portions 14444a and 14444b of the U-shaped structure and the corresponding hinges 1446a and 1446b of the connection member 1446. In the embodiment, the hinges 1446a and 1446b are structurally identical, but the invention is not limited thereto. Only the hinge 1446a will be described in the following description. The hinge 1446a includes a first connection part 14464 and a second connection part 14466 pivotally connected to the first connection part 14464, for connecting the handle 1444 and the rotation member 1442. Therein, the first connection part 14464 is fixed on the rotation disk 14422a of the rotation member 1442 and the second connection part 14466 is fixed on the handle 1444, so that the handle 1444 is pivotally connected to the rotation disk 14422a of the rotatory part 14422 through the connection member 1446. By the pivotal connection of the first connection part 14464 with the second connection part 14466, the handle 1444 can rotate relative to the rotation member 1442. In practice, the hinge 1446a can be substituted by another hinge or device allowing the handle 1444 to rotate relative to the rotation member 1442; however, the invention is not limited thereto. The second constraint structure 14462 has a sliding tab 14462a. In the embodiment, the second constraint structure 14462 as a whole shows a Z-shaped bent plate, which facilitates the fixing to the hinge 1446a. Therein, one of plate end portions functions as the sliding tab 14462a, and the other plate end portion 14462b is fixed on the second connection part 14466. However, the invention is not limited thereto. Thereby, the second constraint structure 14462 (and the sliding tab 14462a thereof) and the second connection part 14466 (and the handle 1444) rotate relative to the first connection part 14464 (or the first constraint structure 1424) together. When the sliding tab 14462a slides in the sliding slot 1424a, the sliding slot 1424a structurally constrains the sliding tab 14462a so that the second connection part 14466 cannot rotate relative to the first connection part 14464; that is the handle 1444 cannot rotate relative to the rotation member 1442. In the embodiment, when the sliding tab 14462a slides in the sliding slot 1424a, the handle 1444 remains close to the back cover 12a. When the sliding tab 14462a departs from the sliding slot 1424a (i.e. located in the slot opening 1424b), the sliding tab 14462a is not structurally constrained by the sliding slot 1424a any longer so that the second connection part 14466 can rotate relative to the first connection part 14464; that is the handle 1444 can rotate relative to the rotation member 1442. For example, the handle 1444 can rotate away from the base 142.

Figure 3:
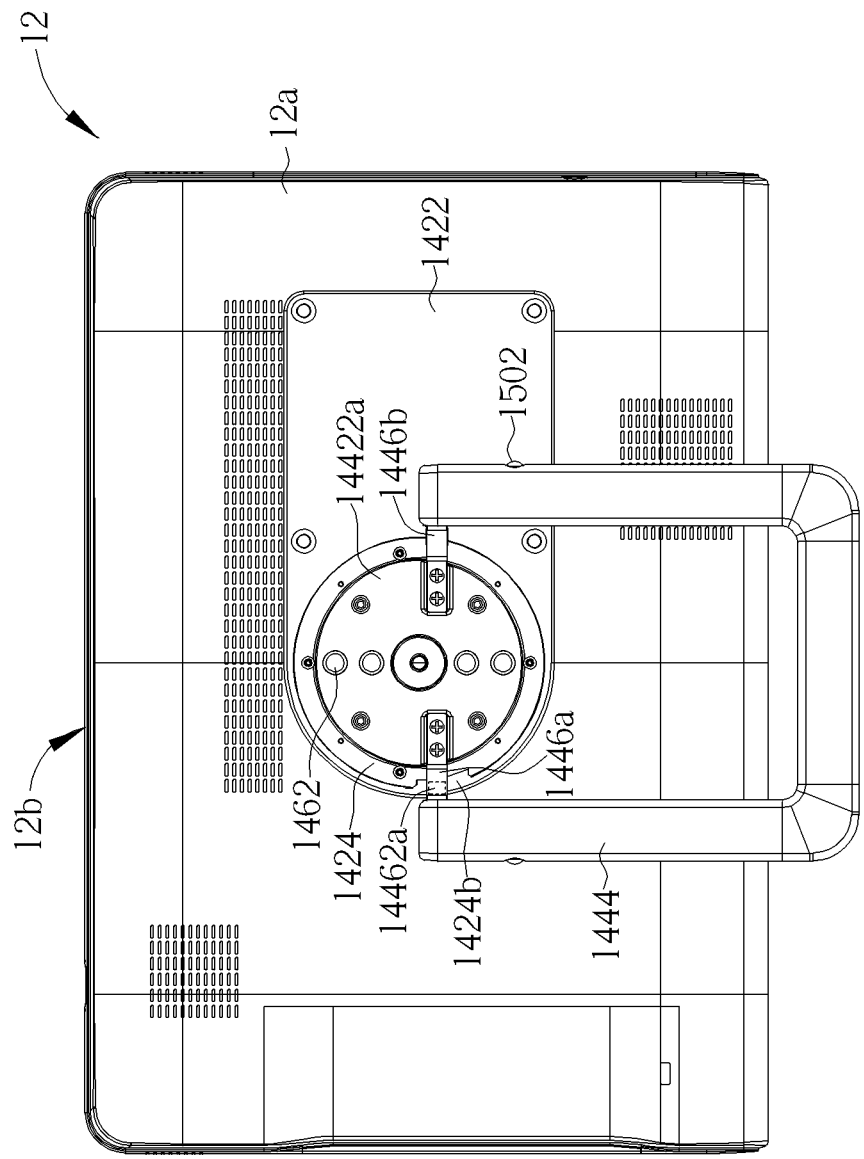
FIG. 3 is a top view of the display in FIG. 1 when a rotation member of the supporting device is located at a second position relative to a base of the supporting device.
Figure 4:
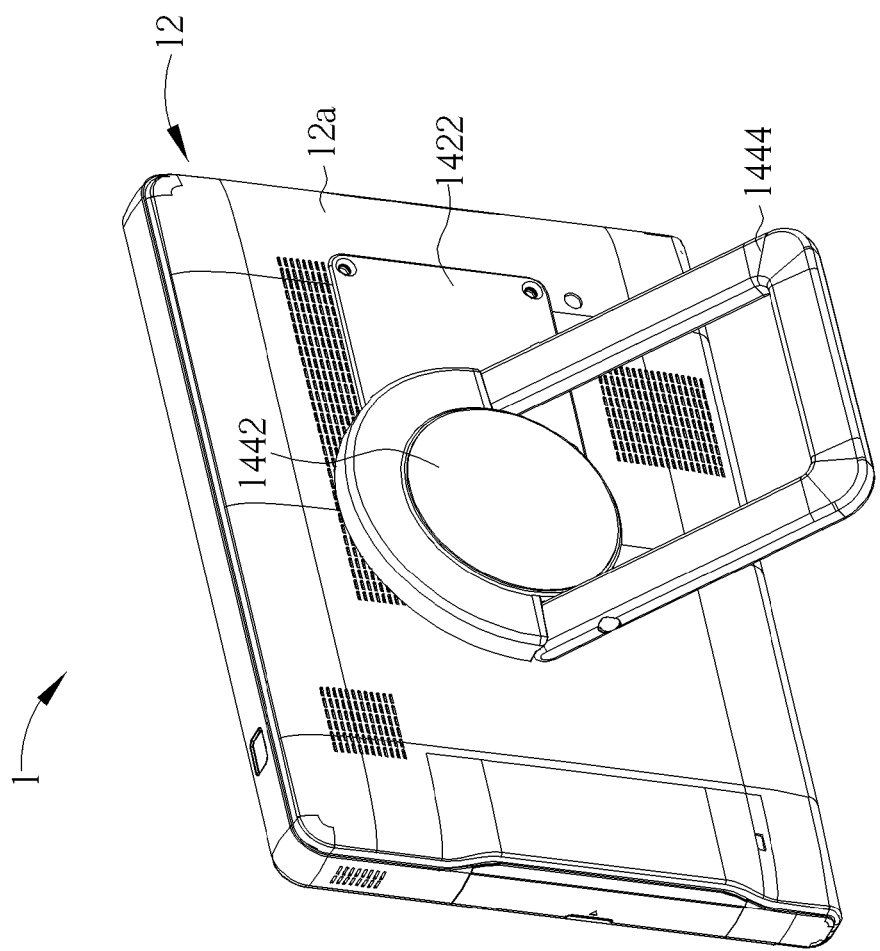
FIG. 4 is a schematic diagram illustrating the display in FIG. 1 is placed on a desktop.
Figure 5:
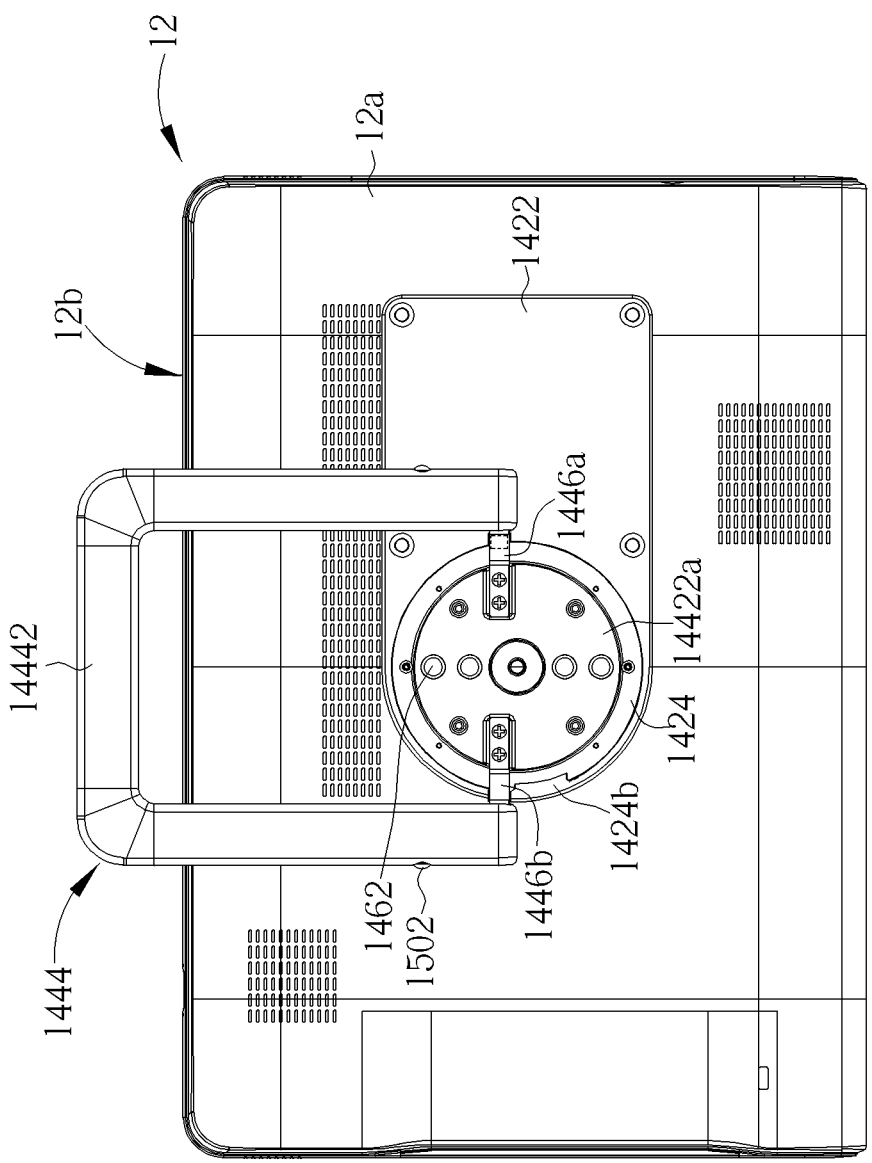
FIG. 5 is a top view of the display in FIG. 1 when the rotation member is located at a first position relative to the base.
Figure 6:
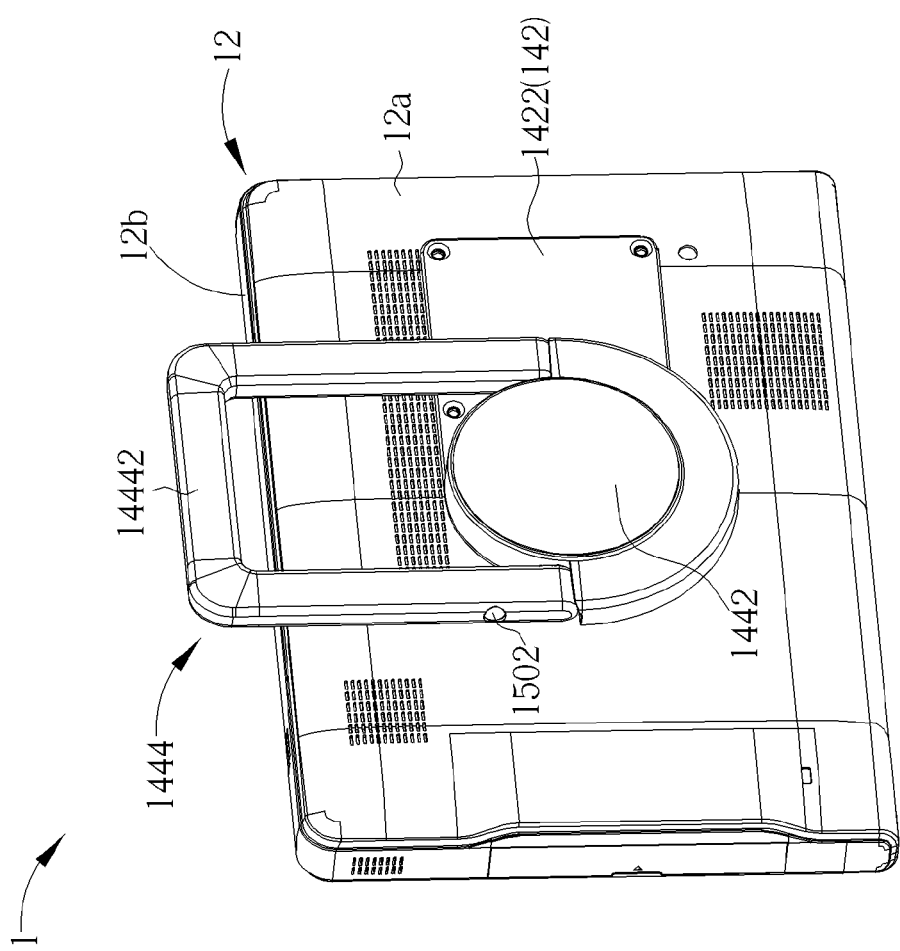
FIG. 6 is a schematic diagram illustrating the display in FIG. 1 is in a state of being capable of being carried or held.

Please also refer to FIG. 3. FIG. 3 is a top view of the connection member 1446 when the rotation member 1442 is located at a second position relative to the base 142. Therein, the casing 14422b is not shown in the figure so that a relative position of the connection member 1446 and the base 142 can be shown, and portions of the sliding tab 14462a that are covered by the second connection part 14466 are shown in dashed lines. As shown by FIG. 3, the sliding tab 14462a is located at the slot opening 1424b, so the handle 1444 can rotate relative to the first connection part 14464. At the moment, the position where the rotation member 1442 is located relative to the base 142 is defined as the second position. Thereby, the user can manipulate the handle 1444 to rotate away from the base 142 relative to the rotation member 1442 through the connection member 1446, so that the display module 12 is supported on a desktop 2 through the supporting device 14, as shown by FIG. 4. Therein, an oblique supporting angle at which the supporting device 14 supports the display module 12 can be determined by the hinges 1446a and 1446b of the connection member 1446 (e.g. the frictional force between the first connection part 14464 and the second connection part 14466) or structural interference between components (i.e. between the casing 14422b and the handle 1444 or between the casing 14422b and the sliding tab 14462a). Afterwards, the user can rotate the handle 1444 toward the base 142, so that the sliding tab 14462a aligns with the sliding slot 1424a so as to be capable of rotating with the rotation member 1442 relative to the base 142 (e.g. by rotating the handle 1444 relative to the base 142) and entering the sliding slot 1424*a*. When the handle 1444 rotates relative to the rotation member 1442, so that the sliding tab 14462*a* departs from the slot opening 1424*b* and enters the sliding slot 1424*a* (as shown by FIG. 5), the handle 1444 is rotated to the upper position (at the moment, the position where the rotation member 1442 is located relative to the base 142 is defined as a first position where). The sliding slot 1424*a* structurally constrains the sliding tab 14462*a*, so the handle 1444 cannot rotate relative to the rotation member 1442, which is convenient for the user to carry or hold the display module 12 by use of the handle 1444, as shown by FIG. 6. Therein, in the embodiment, when the rotation member 1442 is located at the first position relative to the base 142, the handle 1444 remains relatively close to the back cover 12*a* of the display module 12, which is convenient for the user to apply force to the handle 1444 for carrying or holding. Furthermore, a handle 14442 of the handle 1444 protrudes out of an edge 12*b* of the display module 12, the design of which facilitates grasping the handle 14442 by the user. However, the invention is not limited thereto.

As described above, for the display 1, when the rotation member 1442 is located at the first position (as shown by FIG. 5) relative to the base 142, the sliding tab 14462*a* is slidably located in the sliding slot 1424*a*, so that the first constraint structure 1424 is engaged with the second constraint structure 14462 for preventing the second connection part 14466 from rotating relative to the first connection part 14464; that is the handle 1444 is prevented from rotating relative to the rotation member 1442 through the connection member 1446. When the rotation member 1442 is located at the second position (as shown by FIG. 3) relative to the base 142, the first constraint structure 1424 is disengaged from the second constraint structure 14462, so that the handle 1444 is rotatable relative to the rotation member 1442 through the connection member 1446. Therefore, the user can take advantage of the properties of the supporting device 14 for the purposes of supporting and carrying or holding the display module 12, which solves the problem in the prior art that the conventional supporting devices cannot provide both supporting function and carrying function.

Figure 7:
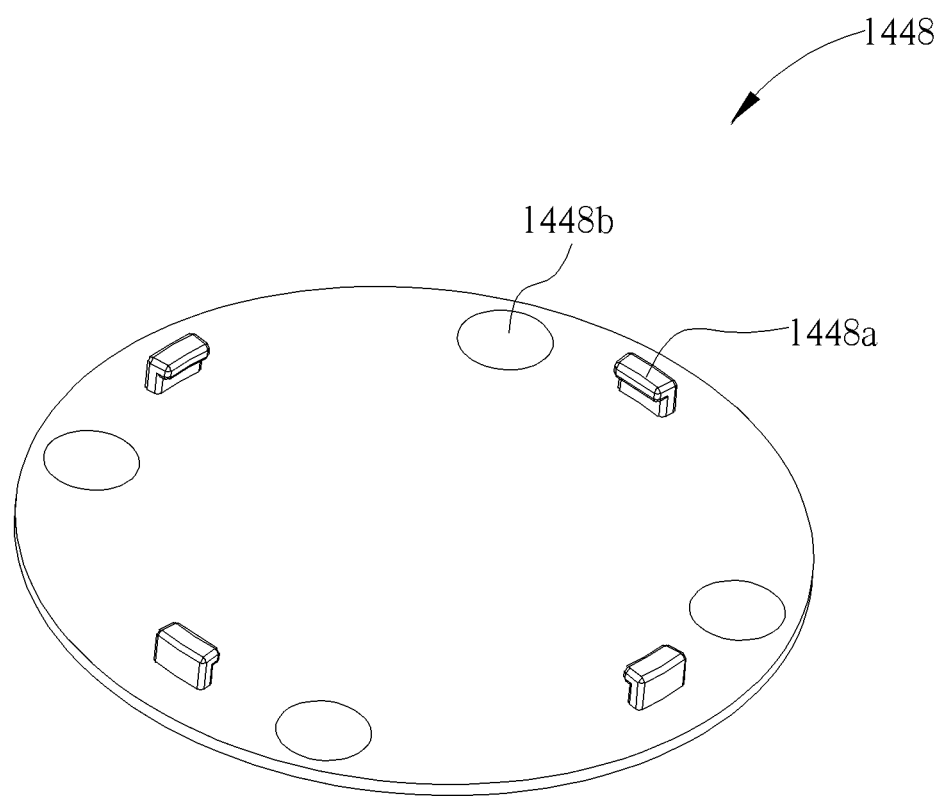
FIG. 7 is a schematic diagram illustrating a cover 1448 of the supporting device in FIG. 2 from another viewpoint.

In addition, in the embodiment, the casing 14422*b* covers the rotation disk 14422*a* and a portion of the connection member 1446 (e.g. including the first connection part 14464 and a portion of the second connection part 14466, even and the sliding tab 14462*a*) for an aesthetic appearance. In the embodiment, the supporting device 14 further includes a cover 1448 fixed on the casing 14422*b* of the rotatory part 14422 and covering the pivotal connection shaft 14424, which makes the supporting device 14 more aesthetic. Please also refer to FIG. 7. FIG. 7 is a schematic diagram illustrating the cover 1448 from another viewpoint. In the embodiment, the casing 14422*b* of the rotatory part 14422 includes a plurality of lock slots 14422*c* and a plurality of first magnetic parts 14422*d* (as shown by FIG. 2). The cover 1448 includes a plurality of hooks 1448*a* and a plurality of second magnetic parts 1448*b* correspondingly. By the plurality of hooks 1448*a* hooking the plurality of corresponding lock slots 14422*c* and the plurality of first magnetic part 14422*d* facing the plurality of corresponding second magnetic part 1448*b* to produce magnetic attraction force respectively, the cover 1448 can remain fixed on the casing 14422*b* of the rotatory part 14422. In addition to keeping the cover 1448 fixed on the casing 14422*b*, the magnetic attraction force can assist the cover 1448 in rotating and being assembled onto the casing 14422*b*. However, the invention is not limited thereto. For example, it is also practicable to stick or tight fit the cover 1448 to the casing 14422*b*.

In addition, in the embodiment, the sliding slot 1424*a*, except for the portion corresponding to the slot opening 1424*b*, extends along the circumference of the rotation disk 14422*a*. Therefore, in principle, on the condition that the rotation member 1442 is not located at the second position relative to the base 142 (i.e. the sliding tab 14462*a* being not located at the slot opening 1424*b*), the handle 1444 cannot rotate relative to the rotation member 1442 through the connection member 1446. As shown by FIG. 2, in practice, the first constraint structure 1424 can be provided with more slot openings, for example slot openings 1424*c* and 1424*d* (the positions of which are shown by dashed lines in FIG. 2). In this case, when the sliding tab 14462*a* rotates to the slot opening 1424*c* or 1424*d* along with the connection member 1446 (and the rotation member 1442), the sliding tab 14462*a* is not structurally constrained by the sliding slot 1424*a* any longer, so that the handle 1444 can rotate away from the base 142 relative to the rotation member 1442 and the user can manipulate the handle 1444 for using the supporting device 14 to support the display module 12 by a short edge of the display module 12 on a desktop. As shown by FIG. 4, the supporting device 14 supports the display module 12 by a long edge of the display module 12 on the desktop 2 comparatively. Therefore, when the sliding tab 14462*a* is located at one of the slot openings 1424*b*, 1424*c* and 1424*d*, the positions (including the second position) where the rotation member 1442 is located relative to the base 142 can be regarded as supporting positions of the supporting device 14 (i.e. for supporting the display module 12, for example, on the desktop 2). In addition, in the embodiment, the effect of the sliding slot 1424*a* structurally constraining the sliding tab 14462*a* (i.e. for preventing the second connection part 14466 from rotating relative to the first connection part 14464) is conducive to the rotational stability of the handle 1444 relative to the rotation member 1442.

In addition, the supporting device 14 further includes a locating mechanism 146 for positioning the rotation member 1442 relative to the base 142. Therein, the locating mechanism 146 includes a resilient positioning part 1462 and a plurality of positioning holes 1464*a-d*. The resilient positioning part 1462 can be but not limited to a ball plunger and is disposed on the rotation disk 14422*a* of the rotation member 1442. The positioning holes 1464*a-d* are disposed on the base plate 1422 of the base 142. According to the rotation of the rotation disk 14422*a*, the resilient positioning part 1462 selectively fits in one of the plurality of positioning holes 1464*a-d*, so that the rotation member 1442 can be positioned relative to the base 142 stably. For example, when the resilient positioning part 1462 fits in the positioning hole 1464*a*, the sliding tab 14462*a* is located at the slot opening 1424*b*, and the display module 12 can be supported by its long edge on the desktop 2 through the supporting device 14 (as shown by FIG. 4). When the resilient positioning part 1462 fits in the positioning hole 1464*b* or 1464*d*, the sliding tab 14462*a* is located at the slot opening 1424*c* or 1424*d*, and the display module 12 can be supported by its short edge on a desktop through the supporting device 14. When the resilient positioning part 1462 fits in the positioning hole 1464*c*, the sliding tab 14462*a* remains being in the sliding slot 1424*a*, and the rotation member 1442 can be located at the first position relative to the base 142 so that the user can carry or hold the display module 12 through handle 1444. In the embodiment, the locating mechanism 146 includes a plurality of resilient positioning parts and a plurality of matching positioning holes, for further enhancing the above positioning effect. In addition, in principle, it is practicable to oppositely dispose the resilient positioning part 1462 and the plurality of positioning holes 1464a-d. Therefore, in practice, the resilient positioning part 1462 can be disposed on the base plate 1422 of the base 142, and the plurality of positioning holes 1464a-d can be disposed on the rotation disk 14422a of the rotation member 1442 accordingly.

In addition, in the embodiment, the handle 1444 is pivotally connected to two opposite sides of the rotation member 1442, which is conducive to the stability of the handle 1444 linking the rotation member 1442 through the connection member 1446. However, the invention is not limited thereto. For example, the handle can be modified to be pivotally connected to the rotation member 1442 through a single structure. For an example, the handle shows an L-shape structure, the upper end of which is connected to the rotation member 1442, the lower end of which functions as a support for being supported on a desktop or a handle for the user to grasp. For another example, the handle shows a T-shaped structure, the lower end of which is connected to the rotation member 1442, the upper end of which functions as a support for being supported on a desktop or a handle for the user to grasp. In addition, as shown in FIG. 2, the connection member 1446 further includes another second constraint structure 14463 (shown by dashed lines) disposed opposite to the second constraint structure 14462 and fixed on the hinge 1446b. The sliding slot 1424a includes a slot opening 1424e (the position of which is shown by dashed lines) accordingly. The first constraint structure 1424 structurally can constrain the second constraint structures 14462 and 14463 at the same time. When the sliding tab 14462a is located at the slot opening 1424a, the sliding tab 14463a of the second constraint structure 14463 is located at the slot opening 1424e too, so that the handle 1444 can rotate relative to the base 142, for example rotating away from the base 142 so that the supporting device 14 can support the display module 12 on a desktop.

Figure 8:
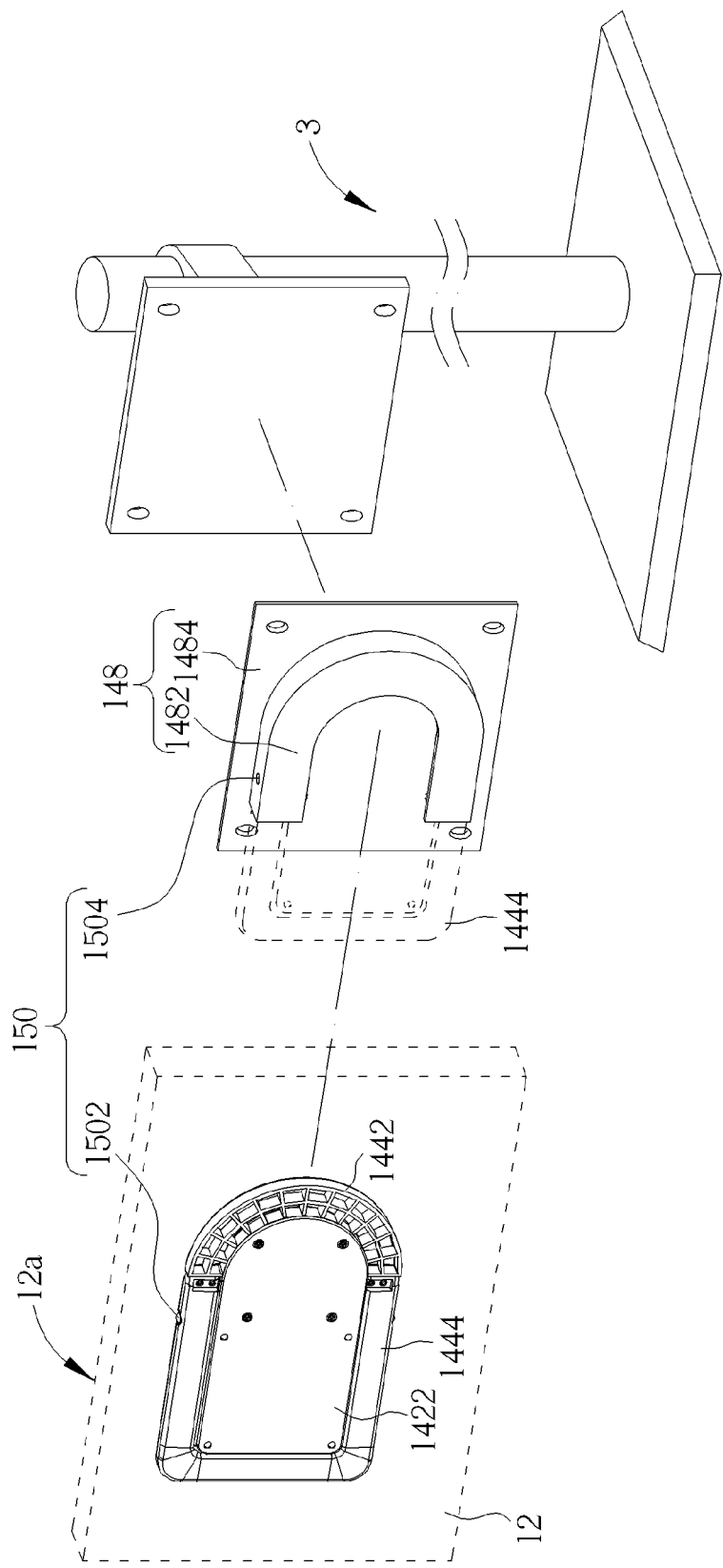
FIG. 8 is an assembly diagram illustrating the supporting device in FIG. 1 is disposed on a supporting frame through an adapter.

In addition, as shown by FIG. 8, in the embodiment, the supporting device 14 further includes an adapter 148. The adapter 148 is used for accommodating the rotatable support 144 so that the supporting device 14 can be fixed through the adapter 148 on another object, which is for example but not limited to a supporting frame 3, so that the display module 12 can be disposed on the supporting frame 3 through the supporting device 14. Therein, the viewpoint of the supporting device 14 is different from that of FIG. 1. The adapter 148 includes an accommodating recess 1482 and a fixing portion 1484. The accommodating recess 1482 is used for accommodating the rotation member 1442 and at least one portion of the handle 1444 (shown in dashed lines in FIG. 8). The fixing portion 1484 is used for being fixed on the supporting frame 3. Because the rotation member 1442 and the at least one portion of the handle 1444 are structurally constrained by the accommodating recess 1482, the handle 1444 cannot rotate relative to the rotation member 1442, so that the whole supporting device 14 can be fixed on the supporting frame 3 and therefore the display module 12 is supported on the supporting frame 3. In a practical application, the adapter 148 can be fixed on other wall mounts or directly on a wall surface. In addition, in practice, the accommodating recess 1482 can be modified to capable of accommodating the rotation member 1442 and the whole handle 1444, which is conducive to the combination stability of the rotatable support 144 with the adapter 148.

Furthermore, in the embodiment, the supporting device 14 further includes another locating mechanism 150. The locating mechanism 150 includes a resilient positioning part 1502 and a positioning hole 1504. The resilient positioning part 1502 can be for example but not limited to a ball plunger and is disposed on the handle 1444. The positioning hole 1504 can be for example but not limited to a through hole and is disposed in the accommodating recess 1482 of the adapter 148 correspondingly, so that when the rotation member 1442 and the portion of the handle 1444 are accommodated in the accommodating recess 1482, the handle 1444 is rotated toward the base 142 and the resilient positioning part 1502 fits in the positioning hole 1504 so that the rotatable support 144 can be positioned relative to the adapter 148 stably. In addition, in principle, it is practicable to oppositely dispose the resilient positioning part 1502 and the positioning hole 1504 and performs the positioning and fixing effect. Therefore, in practice, the resilient positioning part 1502 can be disposed on the adapter 148, and the positioning hole 1504 can be disposed on the handle 1444 accordingly.

In addition, as described above, the supporting device 14 uses the base 142 to fix the display module 12 and achieves the purpose of supporting and carrying the display module 12 (for example supported on the desktop 2, supported on the supporting frame 3, and carried or held through the handle 1444). However, the invention is not limited thereto. In a practical application, the supporting device 14 can be used to support other objects. Furthermore, the supporting device 14 is combined with the back cover 12a of the display module 12 through the base 142. In practice, the base 142 can be structurally integrated with the back cover 12a. For example, the back cover 12a also functions as the base plate 1422 of the base 142.

Figure 9:
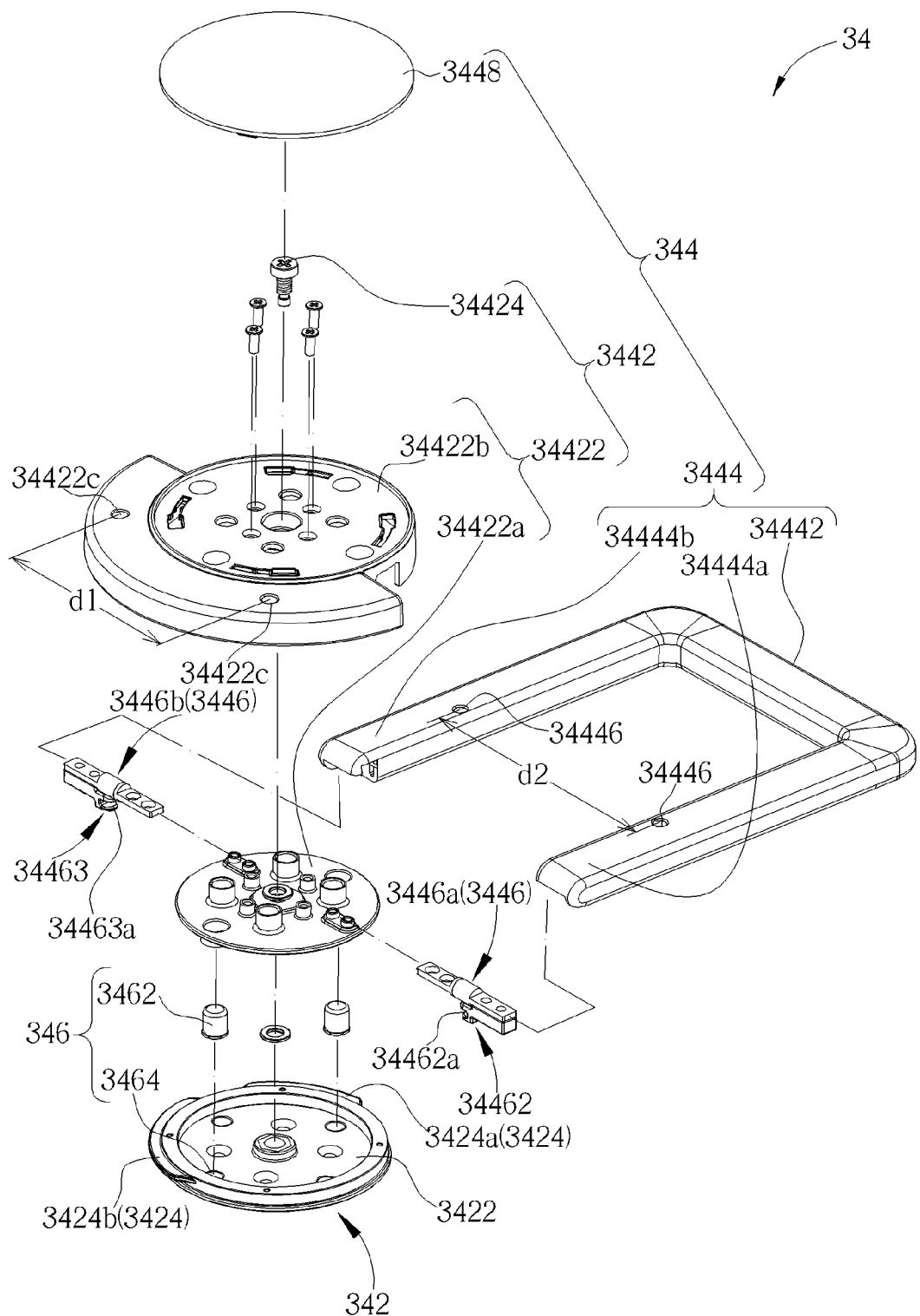
FIG. 9 is an exploded view of a supporting device of a supporting device of another embodiment according to the invention.

Please refer to FIG. 9, which is an exploded view of a supporting device 34 of a supporting device of another embodiment according to the invention. The action logic of the supporting device 34 is the same as the action logic of the supporting device 14. The supporting device 34, as well as the supporting device 14, can be used for supporting the display module 12. For other descriptions about the supporting device 34, please refer to the relevant descriptions of the supporting device 14, especially to the relevant descriptions of the components with the same name, which will not be described in addition. In the embodiment, a rotatable support 344 of the supporting device 34 includes a rotation member 3442, a handle 3444, and a connection member 3446. The handle 3444 and the rotation member 3442 are pivotally connected through hinges 3446a and 3446b of the connection member 3446. The rotation member 3442 includes a rotatory part 34422 and a pivotal connection shaft 34424. The rotatory part 34422 is pivotally connected to a base plate 3422 of a base 342 through the pivotal connection shaft 34424. The hinges 3446a and 3446b connect a rotation disk 34422a of the rotatory part 34422 and end portions 34444a and 34444b of the handle 3444. A casing 34422b of the rotatory part 34422 is fixedly connected to the rotation disk 34422a and covers the rotation disk 34422a and a first constraint structure 3424 of the base 342 disposed on the base plate 3422, which makes the supporting device 34 aesthetic. Furthermore, the rotatable support 344 includes a cover 3448 assembled onto the casing 34422b of the rotatory part 34422 and covers the pivotal connection shaft 34424, which makes the supporting device 34 more aesthetic.

The first constraint structure 3424 has two constraint plates 3424a and 3424b. Correspondingly, the connection member 3446 includes two second constraint structures 34462 and 34463 disposed on the hinges 3446a and 3446b respectively. The second constraint structures 34462 and 34463 include sliding slots 34462a and 34463a respectively.

The constraint plates 3424a and 3424b extend along a curve path relative to the rotation disk 34422a of the rotation member 3442. The sliding slots 34462a and 34463a match with the constraint plates 3424a and 3424b respectively, so that when the sliding slot 34462a or 34463a slides on the constraint plate 3424a or 3424b (i.e. the constraint plate 3424a or 3424b relatively slides in the sliding slot 34462a or 34463a), the first constraint structure 3424 is engaged with the second constraint structure 34462 or 34463 and the constraint plate 3424a or 3424b structurally constrains the sliding slot 34462a or 34463a, so that the handle 3444 cannot rotate relative to the rotation member 3442. When the rotation member 3442 is located at a first position (similar to the position where the rotation member 1442 is located relative to the base 142, as shown by FIG. 5) relative to the base 342, the constraint plates 3424a and 3424b relatively slide in the sliding slots 34463a and 34462a respectively, so that the first constraint structure 3424 and the second constraint structures 34462 and 34463 are engaged with each other for preventing the handle 3444 from rotating relative to the rotation member 3442 through the connection member 3446. At the moment, the user can carry or hold the display module 12 through a handle 34442 of the handle 3444, which is similar to FIG. 6. When the rotation member 3442 is located at a second position (similar to the position where the rotation member 1442 is located relative to the base 142, as shown by FIG. 3) relative to the base 342, the constraint plates 3424a and 3424b depart from the sliding slots 34463a and 34462a and the first constraint structure 3424 is disengaged from the second constraint structures 34462 and 34463, so that the handle 3444 is rotatable relative to the rotation member 3442 through the connection member 3446. At the moment, the user can manipulate the handle 3444 to rotate away from the base 342 relative to the rotation member 3442 through the connection member 3446, so that the display module 12 is supported on the desktop 2 through the supporting device 34, which is similar to FIG. 4.

Furthermore, the supporting device 34 includes a locating mechanism 346 for positioning the rotation member 3442 relative to the base 342. Therein, the locating mechanism 346 includes a resilient positioning part 3462 and a plurality of positioning holes 3464. The resilient positioning part 3462 and the plurality of positioning holes 3464 are disposed on the rotation disk 34422a and the base plate 3422 respectively. The resilient positioning part 3462 selectively fits in one of the plurality of positioning holes 3464, so that the rotation member 3442 can be positioned relative to the base 342. In practice, it is practicable to oppositely dispose the resilient positioning part 3462 and the plurality of positioning holes 3464 on the base plate 3422 and the rotation disk 34422a respectively, which also can perform the above position effect.

In addition, in the embodiment, the casing 34422b of the rotation member 3442 includes two first fixing holes 34422c. The handle 3444 includes two second fixing holes 34446. By the first fixing holes 34422c or the second fixing holes 34446, the supporting device 34 can be disposed on another object, for example on the supporting frame 3 mentioned above or on a wall surface, so that the display module 12 can be disposed on the supporting frame 3 or the wall surface through the supporting device 34. Therein, an interval d1 of the two first fixing holes 34422c conforms to a first mounting interface. An interval d2 of the two second fixing holes 34446 conforms to a second mounting interface. The first mounting interface is different from the second mounting interface. For example, the two mounting interfaces can be obtained according to two mounting patterns selected from VESA mounting interface standard, e.g. 75 mm×75 mm and 100 mm×100 mm. For this case, the interval d1 is equal to 75 mm, and the interval d2 is equal to 100 mm. Therefore, the supporting device 34 can be mounted through different mounting interfaces.

In addition, the design for the first fixing hole 34422c and the second fixing hole 34446 also can be applied to the supporting device 14. Similarly, the adapter 148 for the supporting device 14 also can be applied to the supporting device 34. In addition, in the embodiment, compared to the base plate 1422 of the supporting device 14, the base plate 3422 of the base 342 is reduced to a circular plate. The portion of the base plate 3422 by which the base plate 3422 is combined with the back cover 12a of the display module 12 is closer to the pivotal connection shaft 34424 and the connection member 3446, which is conducive to the stability of rotating the rotatable support 344 after the supporting device 34 is fixed on the display module 12.

Figure 10:
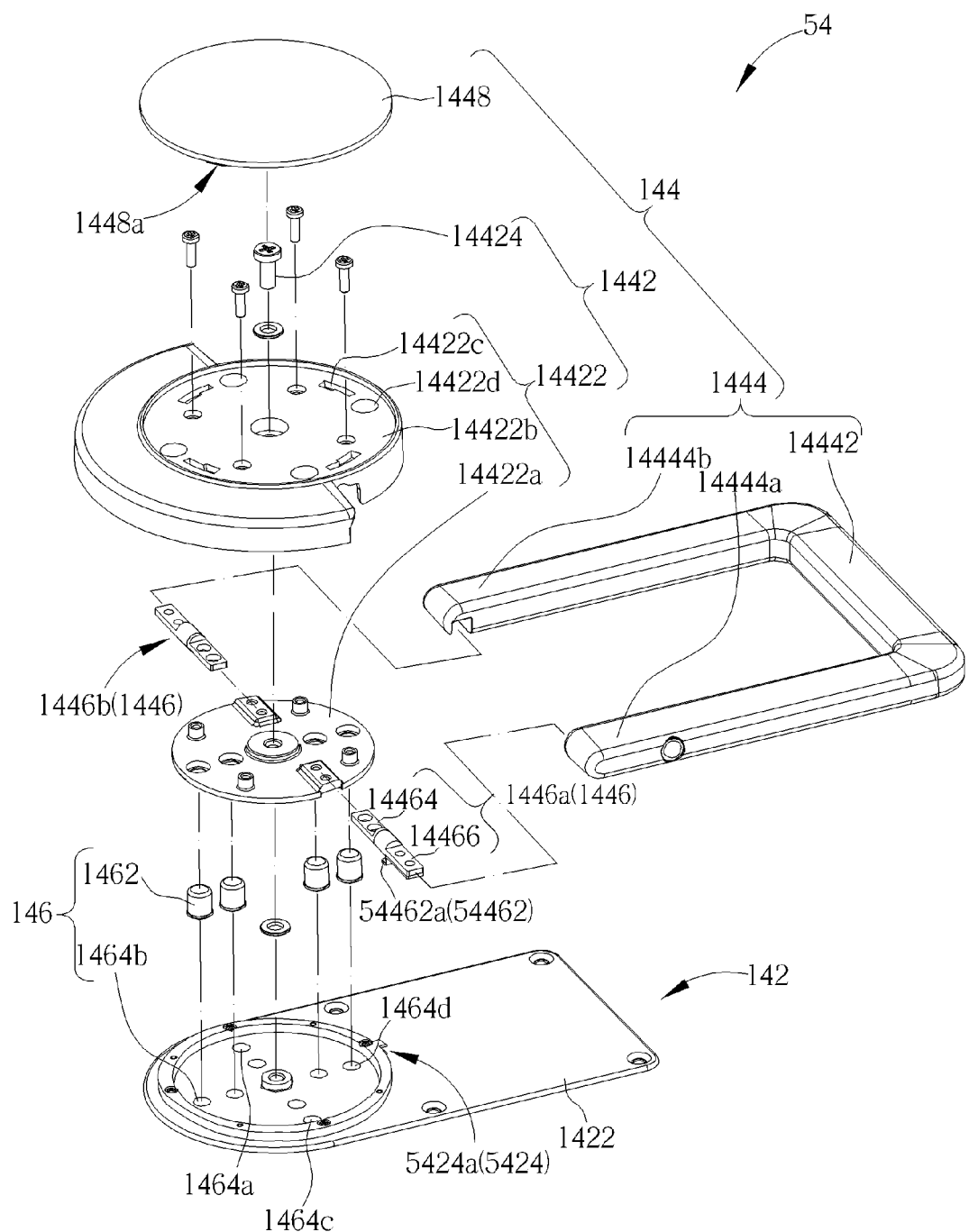
FIG. 10 is an exploded view of a supporting device of a supporting device of another embodiment according to the invention.

In addition, for the supporting devices 14 and 34, because of a geometric relationship in disposition between the first constraint structures 1424 and 3424 and the second constraint structures 14462, 14463, 34462 and 34463, the handles 1444 and 3444 are allowed to rotate away from the bases 142 and 342 only when the rotation members 1442 and 3442 are located at the several specific positions relative to the bases 142 and 342; however, the invention is not limited thereto. Please refer to FIG. 10, which is an exploded view of a supporting device 54 of a supporting device of another embodiment according to the invention. The supporting device 54 and the supporting device 14 are substantially the same in structure, so the supporting device 54 still uses the denotations used in the supporting device 14. For other descriptions about the supporting device 54, please refer to the relevant descriptions of the supporting device 14, which will not be described in addition. A difference between the supporting device 54 and the supporting device 14 is that a first constraint structure 5424 of the supporting device 54 has a lock slot 5424a and a second constraint structure 54462 of the supporting device 54 has a lock tab 54462a. When the rotation member 1442 is located at a first position (similar to the position where the rotation member 1442 is located relative to the base 142, as shown by FIG. 5) relative to the base 142, the lock tab 54462a is inserted in the lock slot 5424a, so that the first constraint structure 5424 and the second constraint structure 54462 are engaged with each other and prevent the handle 1444 from rotating relative to the rotation member 1442 through the connection member 1446. At the moment, the user can carry or hold the display module 12 through the handle 14442 of the handle 1444, which is similar to FIG. 6. When the rotation member 1442 is rotated relative to the base 142 to depart away from the first position, the lock tab 54462a is disengaged from the lock slot 5424a, so that the handle 1444 is rotatable relative to the base 142. In practice, if it is required to obtain more rotation angular positions of the rotation member 1442 relative to the base 142 so that the handle 1444 cannot rotate relative to the base 142 when the rotation member 1442 is located at these rotation angular positions, the first constraint structure 5424 of the supporting device 54 can be provided with more lock slots 5424a capable of engaging with the lock tab 54462a for preventing the handle 1444 from rotating relative to the base 142. Furthermore, in principle, it is practicable for obtaining a structural constraint to oppositely dispose the lock slot 5424a and the lock tab 54462a. Therefore, in practice, the lock tab 54462a can be disposed on the base 142, and the lock slot 5424a can be disposed on the connection member 1446 accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display with a supporting mechanism, comprising:
   a portable electronic display module; and
   a supporting device connecting the display module, the supporting device comprising:
   a base for fixing the display module, the base comprising a first constraint structure; and
   a rotatable support comprising a rotation member, a handle, and a connection member, the rotation member being pivotally connected to the base, the handle and the rotation member being pivotally connected through the connection member so that the handle can rotate toward and away from the base, the connection member comprising a second constraint structure, the second constraint structure being either engaged with or disengaged from the first constraint structure, wherein when the rotation member is located at a first position relative to the base, the first constraint structure and the second constraint structure are engaged with each other and prevent the handle from rotating relative to the rotation member through the connection member.

2. The display of claim 1, wherein when the rotation member is located at a second position relative to the base, the first constraint structure and the second constraint structure are disengaged, so that the handle is rotatable relative to the rotation member through the connection member.

3. The display of claim 2, wherein the rotation member and the base are pivotally connected by a first rotation axis, the handle and the rotation member are pivotally connected through the connection member by a second rotation axis, and the first rotation axis is perpendicular to the second rotation axis.

4. The display of claim 1, wherein the first constraint structure has a lock slot or a lock tab, the second constraint structure has a lock tab or a lock slot correspondingly, and when the rotation member is located at the first position relative to the base, the lock tab is inserted into the lock slot, so that the first constraint structure and the second constraint structure are engaged with each other and prevent the handle from rotating relative to the rotation member through the connection member.

5. The display of claim 1, wherein the first constraint structure has a sliding slot which extends in a curve path relative to the rotation member, the second constraint structure has a sliding tab, and when the rotation member is located at the first position relative to the base, the sliding tab is slidably located in the sliding slot, so that the first constraint structure and the second constraint structure are engaged with each other and prevent the handle from rotating relative to the rotation member through the connection member.

6. The display of claim 1, wherein the first constraint structure has a constraint plate which extends in a curve path relative to the rotation member, the second constraint structure has a sliding slot, and when the rotation member is located at the first position relative to the base, the constraint plate is relatively slidably located in the sliding slot, so that the first constraint structure and the second constraint structure are engaged with each other and prevent the handle from rotating relative to the rotation member through the connection member.

7. The display of claim 1, wherein the connection member comprises a first connection part and a second connection part pivotally connected to the first connection part, the first connection part is fixed on the rotation member, the second connection part is fixed on the handle, the second constraint structure is disposed on the second connection part, and when the rotation member is located at the first position relative to the base, the first constraint structure and the second constraint structure are engaged with each other and prevent the second connection part from rotating relative to the first connection part.

8. The display of claim 1, wherein the supporting device further comprises a locating mechanism, the locating mechanism comprises a resilient positioning part and a plurality of positioning holes, the resilient positioning part and the plurality of positioning holes are disposed opposite on the base and the rotation member, and the resilient positioning part selectively fits in one of the plurality of positioning holes, so that the rotation member is positioned relative to the base.

9. The display of claim 1, wherein the rotatable support comprises a cover, the rotation member comprises a rotatory part and a pivotal connection shaft, the rotatory part is pivotally connected to the base through the pivotal connection shaft, the cover is fixed on the rotatory part and covers the pivotal connection shaft, and the handle is pivotally connected to the rotatory part through the connection member.

10. The display of claim 9, wherein the rotatory part comprises a lock slot and a first magnetic part, the cover comprises a hook and a second magnetic part, and the cover is fixed on the rotatory part by the hook hooking the lock slot and a magnetic attraction force produced by the first magnetic part and the second magnetic part.

11. The display of claim 1, wherein the supporting device further comprises an adapter comprising:
    an accommodating recess for accommodating the rotation member and at least one portion of the handle; and
    a fixing portion for being fixed on an external supporting frame.

12. The display of claim 11, wherein the supporting device further comprises a locating mechanism, the locating mechanism comprises a resilient positioning part and a positioning hole, the resilient positioning part and the positioning hole are disposed opposite on the adapter and the handle, and when the rotation member and the least one portion of the handle are accommodated in the accommodating recess, the handle rotates towards the base, and the resilient positioning part fits into the positioning hole so that the rotatable support is positioned relative to the adapter.

13. The display of claim 1, wherein the rotation member comprises two first fixing holes, the handle comprises two second fixing holes, an interval between the two first fixing holes conforms with a first mounting interface, an interval between the two second fixing hole conforms with a second mounting interface, and the first mounting interface is different from the second mounting interface.

14. The display of claim 1, wherein the handle is provided in a U-shaped structure, the handle is pivotally connected to the rotation member by two end portions of the U-shaped structure being opposite pivotally connected to the rotation member.

15. The display of claim 1, wherein when the rotation member is located at the first position relative to the base, a portion of the handle protrudes out of an edge of the display module.

* * * * *